March 1, 1960 G. H. FRITZINGER 2,926,983

SHEET RECORD MACHINE

Filed Feb. 14, 1955 2 Sheets-Sheet 1

INVENTOR

George H. Fritzinger

INVENTOR

George H. Fritzinger

United States Patent Office 2,926,983

Patented Mar. 1, 1960

2,926,983

SHEET RECORD MACHINE

George H. Fritzinger, West Orange, N.J., assignor, by mesne assignments, to McGraw-Edison Company, Elgin, Ill., a corporation of Delaware Application February 14, 1955, Serial No. 488,093

11 Claims. (Cl. 346—138)

This invention relates to dictating machines which use a magnetic type of sheet record supported on an endless revolvable surface in the form of an at least substantially closed loop. More particularly, the invention relates to novel sheet mounting and sheet removing apparatus and to novel control mechanism therefor.

In the present type of sheet record machine the revolvable record support has an endless peripheral surface for carrying the sheet in wrap-around relation thereto and has means for attaching the leading edge of the sheet record to the support to provide for drive of the sheet record therewith. As the support is revolved in an advancing direction, a record-engaging magnetic head is moved slowly crosswise to the support so as to scan a helical track on the sheet record with repeated crossing of the joint between the leading and trailing edges thereof. When the sheet record is removed from the support and laid out flat, the scanning track appears as a series of side-by-side parallel lines. Removal of the sheet record is accomplished by a stripper plate engageable with the under side of the sheet record as the record support is reversed.

The sheet record is mounted in at least substantially complete wrap-around relation to the record support. This may be accomplished by having the leading and trailing edges in either an overlapped or butt-joint relationship. However, when a butt joint is provided between the edges, there may be a problem of avoiding fouling of the leading edge on the scanning heads. This may be prevented by concealing the leading edge in a narrow peripheral slit in the record support. Also, there are advantages in mounting a sheet record when the record support is provided with a slit to receive the leading edge, as will appear. An object of my invention is to provide novel apparatus for attaching a leading portion of a sheet record to the record support and for concealing the leading edge in a narrow slit in the supporting surface.

Another object is to provide such attaching and concealing means which is adapted to enable the mounted sheet record to shift angularly and laterally in response to a sheet record locating means on the record support. Another object is to provide improved sheet mounting apparatus adapted to enable easy attachment of the sheet record to the record support while the support is at standstill.

In the present sheet record machine there is provided apparatus operative automatically at the end of a record-removing operation to stop the record support in a correct position, called its "loading position;" for attachment of a new sheet record thereto. A further object is to locate the record support in loading position by means operative positively to block the support against further reverse movement but operative only to detent the record support in directions of advance movement.

Another object is to provide such locating means with a manual release adapted to allow a further single revolution of reverse movement of the record support should the sheet be not removed in the initial reverse movement thereof.

Another object is to assure engagement of the stripper plate with the trailing edge of the sheet record during such further reverse movement of the record support.

Another object is to provide operable means for detaching a sheet record from the record support while the support is at standstill and for concurrently shutting off the power to the machine.

Another object is to provide means for positively locking the record support against movement in either direction as a sheet record is detached.

These and other objects and features of my invention will be apparent from the following description and the appended claims.

In the description of my invention reference is had to the accompanying drawings, of which:

Figure 1 is a fractional plan view of a sheet record machine incorporating my invention;

Figures 2 and 3 are fractional vertical sections taken substantially on the lines 2—2 and 3—3 respectively of Figure 1;

Figure 1:
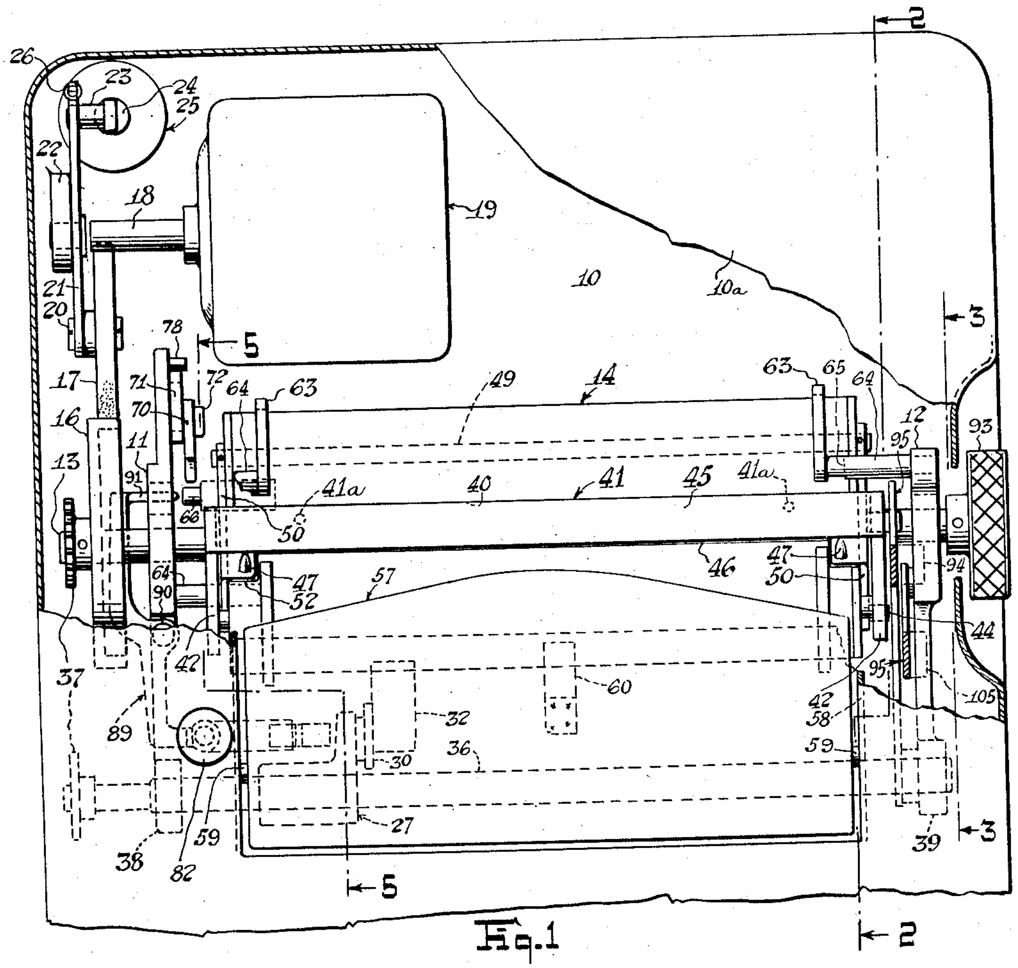

The sheet record machine shown in the figures has a base 10 and an upper cabinet structure 10a to form a complete housing for the operating mechanism. The base 10 is provided with left and right standards 11 and 12. These standards have bearings for a shaft 13 on which is mounted a record support 14 in the form of a drum having a substantially endless peripheral surface for carrying a magnetic sheet record 15, there being a yieldable peripheral covering on the drum to provide a yieldable backing for the sheet record mounted thereon. The drum is driven in a clockwise direction as it appears in Figure 2 by a drive mechanism comprising a drive train shown as including a friction wheel 16 secured to the left end of the shaft 13, a rubber-tired intermediate wheel 17 and a drive shaft 18 of a motor 19. The intermediate drive wheel is journalled at 20 to one end of a rocker 21 itself centrally pivoted to a standard 22 on the base 10. The other end of the rocker is pivoted at 23 to the armature 24 of a solenoid 25. The rocker is biased by a tension spring 26 normally to hold the intermediate drive wheel in disengaged position, but as the solenoid is energized the intermediate wheel is engaged to start forward drive of the drum.

At the front of the drum there is a carriage 27 mounted slidably on a cross rod 28 for lateral movement along the drum. Pivoted at 29 to this carriage is a rocker beam 30 on one end of which is mounted an erase head 31 and on the other end of which is mounted a record-reproduce head 32. The carriage may be shifted forwardly and rearwardly to place the heads into and out of engagement with the drum, and for this purpose it is splined at 33 to the support rod 28 so that it may be shifted by the rod. Mounted on the carriage is a cantilever spring 34 carrying a feed nut 35 for engaging a feed screw 36 concurrently as the heads are placed into engagement with a mounted record. This feed screw has a constant drive coupling with the shaft 13 as by means of a chain drive fractionally indicated at 37. The feed screw 36 and support rod 28 are mounted at their ends in standards 38 and 39.

The sheet record is mounted in wrap-around relation to the drum 14 with attachment only of its leading edge thereto as will appear. As the drum is advanced, the record is engaged by the heads 31 and 32 in response to any suitable biasing of the carriage not shown. Also, under influence of this biasing, the feed nut 35 engages the feed screw 36. Accordingly, the carriage is driven progressively as the drum is rotated to cause the heads to scan a helical path on the sheet record which crosses repeatedly the joint between the trailing and leading edges thereof. During recording, the erase head erases any prior recording on the track in advance of the record head. During reproducing, the erase head is disabled and the record head is operated as a reproducing head. The circuits for so disabling the erase head and for selectively conditioning the machine for recording and reproducing need not however be herein described.

During the mounting and removing of a sheet record onto and from the drum, the heads may be disengaged by turning the rod 28 as aforementioned. As the heads are so disengaged, the feed nut is likewise disengaged from the feed screw to enable the carriage to be then freely moved along the drum by hand.

In accordance with the present sheet mounting arrangement, the drum 14 has a wide peripheral slot 40 along the axis thereof, which is openable and closable by a bail member 41. The bail member has side members 42 pivoted at 44 to the end walls of the drum and has a transverse member 45 which engages the slot 40 and completes substantially the periphery of the drum when the bail member is closed, there being only a narrow slit 46 in the periphery of the drum at the trailing edge of the bail member to receive the leading edge of a mounted sheet record, as will appear.

Positioned rearwordly from the slot 40 and near each end of the drum is a radially and forwardly projecting drive pin 47 which is adapted to engage a complementary drive hole 48 in the leading portion of the sheet record. Extending lengthwise of the drum and journalled in the end walls thereof is a shaft 49 to each end of which is secured a lever 50 having a lug 51 bent inwardly with respect to the drum into a peripheral notch 52 merging with the slot 40 aforementioned. Mounted on these lugs are the drive pins 47. By way of example, each pivot 44 of the bail 41 may be offset rearwardly (with respect to the direction of advance of the drum) from the slot 40 and the shaft 49 for the mounting levers 50 may be offset forwardly from this slot, and the mounting levers 50 may be embraced by the bail 41, all as is shown in Figure 2.

Figure 4:
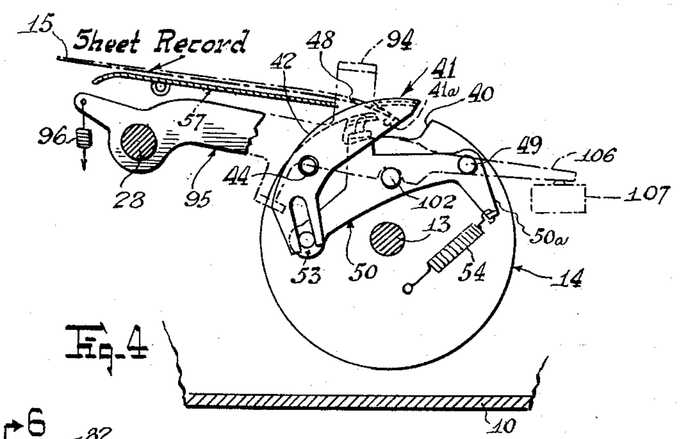
Figure 4 is a righthand end view of the record support and a fractional view of the locking mechanism therefor, showing the support in condition for attachment and removal of a sheet record.

A coupling is provided between the bail 41 and mounting levers 50, which comprises arms on both the levers 50 and side members 42 which overlap the points to the rear of the pivots 44. These overlapping arms have pin and slot connections generally referred to as 53 (Figure 2) which cause the bail member to be held closed when the drive pins are in projecting positions and which cause the bail member to be opened as the shaft 49 is turned to move the drive pins into non-projecting positions (Figure 4). A tension spring 54 connected between an arm **50*a* of one of the mounting levers 50** and a pin on the end wall of the drum serve normally to hold the drive pins in their projecting positions as well as to hold the bail member closed.

Figure 2:
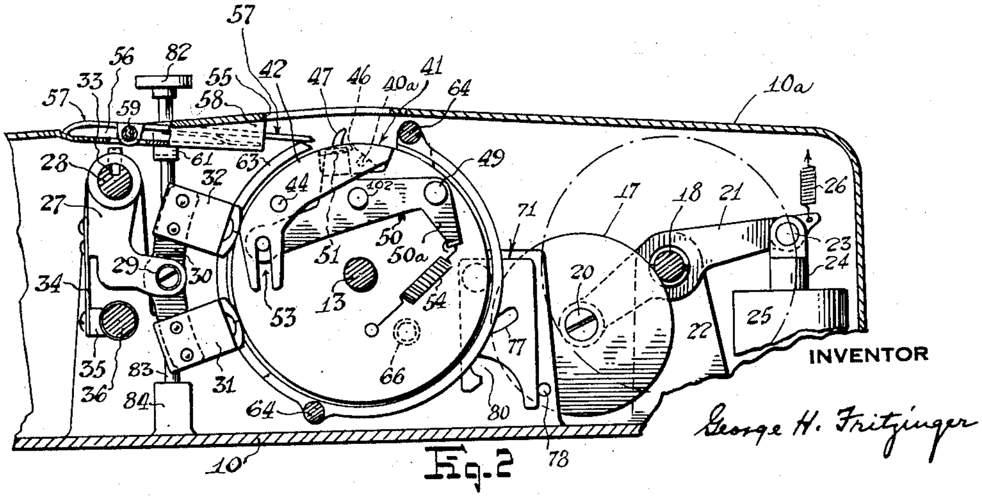

A sheet record is to be attached to and detached from the drum 14 while the drum is at standstill in its loading position aforementioned, in which position the drive pins are at the top of the machine as shown in Figure 2. The upper housing structure **10*a* is formed with a transverse slot 55 directly above the drum and with a wide rectangular depression or recess 56 slanting downwardly from the forward part of the machine and extending along the length of the drum at the front of the slot. Overlying this recess is a plate 57 which inclines downwardly towards the drum to form a channel in the top part of the housing. This is a sheet loading and unloading channel for the machine adapted to guide the sheet into a proper loading position, and the bottom plate 57 is both a loading and stripping plate, as will appear. To facilitate the stripping function of this plate, the trailing edge thereof is convexly shaped as shown in Figure 1. The plate is provided with turned-down ears near its forward end which are apertured to pivot on studs 59 mounted on the side edges 58 of the recess 56. This permits the plate to be tilted into engagement with the drum. Normally the plate is held yieldably out of contact with the drum by a cantilever spring 60 mounted on the under side of the plate and bearing against the bottom wall of the recess 56. The normal position of the plate is defined by engagement of a bracket 61 on the under side of the plate with a cantilever spring 62** shown in Figure 6 and hereinafter more fully described.

Figure 5:
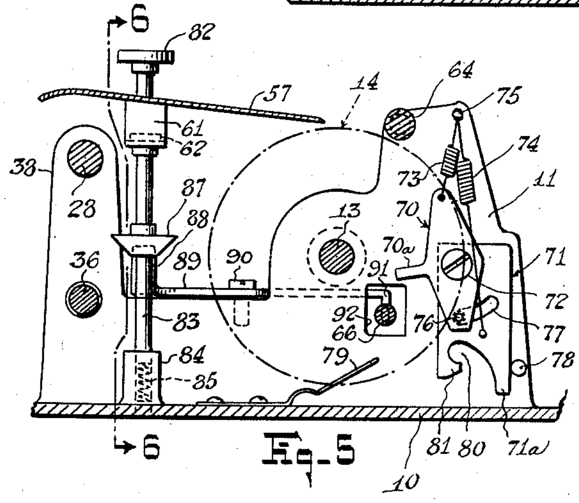
Figure 5 is a vertical fractional section taken substantially on the line 5—5 of Figure 1 and showing the locking apparatus for the record support in its normally inoperative position.
Figure 6:
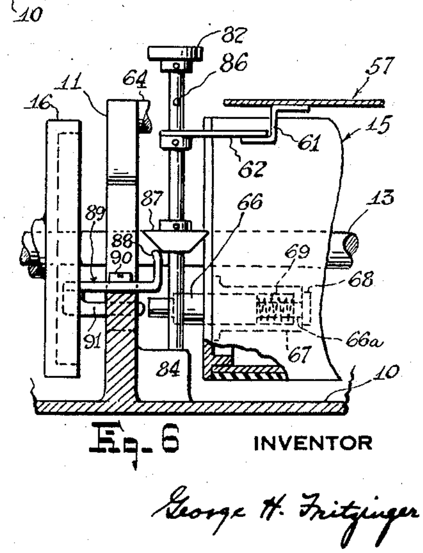
Figure 6 is a fractional section taken substantially on the line 6—6 of Figure 5.

When the drum is in loading position and the bail member is open as shown in Figure 4, an open jaw is formed at the end of the loading plate which is adapted to receive the leading edge of a sheet record as it is passed through the loading channel across the top of the drum. The bottom surface of the transverse bar of the bail 41 is inclined to the periphery of the drum to facilitate the entry of the leading edge of the sheet record into the slot 40. Projecting downwardly from this bottom surface are stop pins **41*a* against which the leading edge abuts to define the loading position of the sheet record. When the sheet record is in this loading position the drive holes 48 are in registration with the drive pins 47 now in their receded positions. When the drive pins are next moved outwardly, they engage these holes to attach the sheet record to the drum and concurrently the bail closes to confine the leading edge of the sheet record in the narrow slit 46. As the drum is then next advanced, the sheet record is wrapped around the drum but the trailing edge need come only into a butt-joint relationship with the sheet record where it emerges from the slit 46. Preferably, although not necessarily, the drive holes are made oversize with respect to the drive pins and the slit is made wider than the thickness of the sheet record so that the sheet record will have freedom for lateral and angular shifting movement in response to a sheet locating means on the drum not hearein necessary to show. Except at the top of the drum where a sheet record is presented to and removed therefrom, there are arcuate guide rails 63 around each end of the drum just to the inside of the drive pins. These guide rails serve to confine the mounted sheet record in close proximity with the drum. The guide rails are supported by studs 64 anchored to the side standards, the studs being suitably notched at 65 to clear the drive pins. When a sheet record is to be removed, it is necessary only to reversely rotate the drum so that the plate 57** now operating as a stripper will engage the under side of the trailing edge of the sheet record and direct the record outwardly through the loading channel towards the front of the machine. It is necessary that the drum be stopped positively when in its reverse movement it reaches its loading position. For this purpose a detent mechanism is provided which is adapted to permit only a single reverse revolution of the drum from the point where the stripper plate engages the trailing edge of the mounted sheet record. This detent mechanism is shown in Figures 5 and 6.

The detent mechanism just mentioned comprises a plunger 66 projecting through the left end wall of the drum and mounted in a barrel 67 having a flanged edge secured as by welding to the inner face of the end wall. The plunger has a reduced diameter portion **66*a* at its inner end which extends through an apertured end wall of the barrel and which terminates in a head 68. A compression spring 69 surrounds the portion 66*a*** and presses the plunger outwardly into a position defined by the abutment of the head against the end of the barrel.

Cooperating with the outer end portion of the plunger is a latch mechanism comprising a trip pawl 70 and a latch plate 71. Both of these members are pivoted on a common stud 72 carried by the adjacent standard 11. The pawl 70 is center-biased by a tension spring 73 and the latch plate is over-center biased by a tension spring 74, both springs being connected to a pin 75 on the standard 11. The pawl and latch plate have a lost-motion coupling formed by a pin 76 on the pawl engaging the arcuate slot 77 in the latch plate. In the normal inoperative positioning of the latch mechanism shown in Figure 5, the latch plate is located by a stop pin 78 in a position wherein it is entirely out of the path of the plunger 66 but a finger 70*a* of the pawl extends into this path. Also, the overcentering force on the latch plate overpowers the centering force on the pawl to hold the latter in an off-center position defined by engagement of the pin 76 with the clockwise end of the slot 77. As the drum is advanced in the normal operation of the machine, the plunger engages the finger 70*a* momentarily during each revolution and cams the pawl counterclockwise against the action of the centering spring 73 until the plunger is moved free thereof, without however imparting any movement to the latch plate.

On the other hand, when the drum is moved reversely as by a knob 93 at the right end of the shaft 13, the plunger engages the finger 70*a* from the other side and cams the pawl clockwise. This engagement is timed to occur just when the stripper plate 57 engages the under side of the trailing edge of the sheet record. The latch plate is now moved in unison with the pawl into an over-center position whereupon it continues to move in a clockwise direction under influence of the over-center spring 74 until a finger 71*a* of the latch plate strikes a cantilever spring 79 riveted to the base 10. In this over-center position of the latch plate a notch 80 thereof is located directly in the path of the plunger. The notch is however preceded by a ridge 81 having a front cam face against which the plunger strikes as it approaches the latch plate, causing the latch plate to be first cammed slightly clockwise against the spring 79 before the plunger engages the notch. By this engagement of the plunger with the notch the drum is stopped positively against further reverse movement from its loading position aforementioned, but by reason of the ridge 81 the drum is held only releasably against advance movement from its loading position. When the drum is in its loading position, the trailing edge of a sheet record mounted thereon is at a distance from the stripper plate 57 (Figure 2) corresponding in angular travel of the drum to the distance of the plunger from the finger 70*a* (Figure 5). Should the stripper plate 57 fail for any reason to engage the under side of the trailing edge of the sheet record as the drum is first reversely rotated into its loading position, the user may release the plunger from the latch plate 71 without displacing the latch plate to permit a further single revolution of reverse movement of the drum. This release is effected by pressing a button 82 positioned at the left side of the loading channel. This button is mounted on a vertical plunger 83 having a bearing at its upper end in the housing wall and a bearing at its lower end in a tubular standard 84. The plunger is biased upwardly by a compression spring 85 within the standard 84 into a position defined by abutment of a cross pin 86 in the plunger as against the under side of the housing wall. On a mid-portion of the plunger there is an inverted conical cam 87 operative against a finger 88 of a lever 89 pivoted on a vertical stud 90 to turn the lever clockwise as the plunger is depressed. The stud 90 is threaded into a step in the front edge of the standard 11. The portion of the lever 89 ahead of the stud extends about in line with the standard 11, but the rearward portion of the lever is offset to the left side of the standard and is disposed partially within a hollow of the flanged drive wheel 16. At its rearward end the lever 89 has a finger 91 extending rightwardly through an opening 92 in the standard 11. This finger is in line with the plunger 66 when the drum is in its loading position and is brought to bear against the plunger to release it from the latch plate as the plunger 83 is depressed. The plunger is held so released until the drum is reversed sufficiently to move the plunger off of the finger 91. When the further single revolution of reverse movement of the drum is completed, the plunger will have again engaged the notch in the latch plate as beforedescribed.

Concurrently as the plunger is depressed to release the latching mechanism, pressure is brought to bear on the stripping plate 57 through the cantilever spring 62 mounted on the plunger and the bracket 61 mounted on the stripping plate. By this pressure, the stripping plate yieldably engages the drum 14 to assure that it will engage the under side of the sheet record to strip it from the drum as the drum is reversed through this further single revolution.

Figure 3:
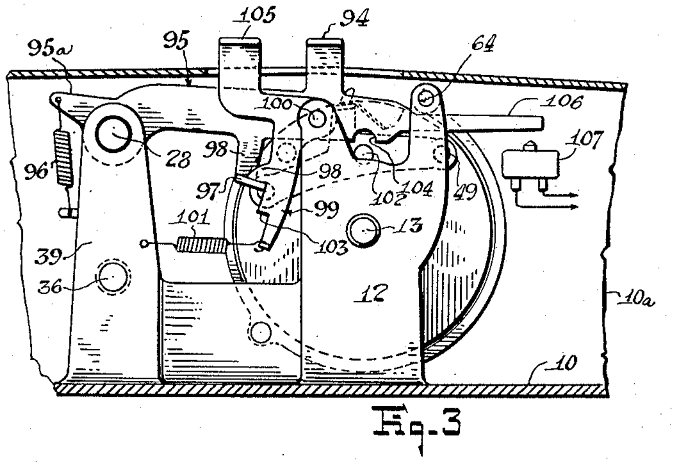

When the drum has reached its loading position with the sheet record having been expelled therefrom by the stripping plate, it is necessary to move the drive pins into their non-projecting positions to detach the sheet record from the drum. Concurrently, it is desirable to lock the drum positively against advance movement from its loading position while the drive pins are so disengaged. Both of these functions are accomplished by depressing a button 94 at the right central portion of the machine. This button is formed on a lever 95 pivoted on the cross rod 28. The lever is biased upwardly by a tension spring 96 connected between a rearward arm 95*a* thereof and the standard 39, but is stopped in a substantially horizontal position by engagement of a turned-over lug 97 on a depending arm thereof with a wide step 98 of a latch lever 99 itself pivoted at 100 to a top portion of the standard 12. Engagement of the latch lever with the lug 97 is maintained at all times by a tension spring 101 connected between the latch lever and standard 39, the action of the spring being to bias the latch lever continuously against the back edge of the lug 97 as shown in Figure 3. When the button 94 is depressed, the lever 95 is moved against a pin 102 on the adjacent mounting lever 50 to move both of the drive pins into their non-projecting positions. When the drive pins have been so moved, the lever 95 becomes latched in its depressed position by engagement of the lug 97 with a second step 103 of the latch lever 99. Also at the point in the lever 95 where it engages the pin 102 there is a notch 104 which serves to lock positively the drum from movement in either direction out of its loading position. When the drive pins are so moved out of disengagement with the sheet record, the record may be withdrawn from the machine. Similarly, a new record may be slid forwardly through the loading channel across the top portion of the drum into loading position as abovedescribed. Once a new sheet record is so placed into loading position, the lever 95 is released from its depressed position by pressing on a button 105 of the latch lever 99, the effect of so depressing the latch lever being to disengage the step 103 from the lug 97 and allow the lever 95 to be turned upwardly to its normal position defined by abutment of the lug 97 with the step 98.

In order that driving forces may not be applied to the drum while it is in its positively locked condition during the removal and remounting of a sheet record from and onto the drum, the lever 95 is provided with an extending arm 106 which engages the button of a microswitch 107 to open this switch as the lever is depressed into its latched position. The switch 97 may be connected either in the circuit of the solenoid 25 or directly in the power supply circuit of the motor 19 for this purpose, it being effective in either case to prevent drive power from being applied to the shaft 13 of the drum.

The embodiment of my invention hereinabove particularly shown and described is intended to be illustrative and not necessarily limitative of my invention since the same is subject to changes and modifications without departure from the scope of my invention, which I endeavor to express according to the following claims.

I claim:

1. A revolvably-mounted record support having a substantially endless peripheral surface for carrying a flexible sheet record thereon in the form of a substantially closed loop; drive pins projecting from said support for engaging cooperating drive holes in the leading portion of the sheet record to provide for drive of the leading edge of the sheet record in substantially fixed circumferential relation to the support and with the remaining portion of the sheet record trailing in wrap-around relation to the support as the support is advanced; means mounting said drive pins for receding movement into inner positions out of engagement with the drive holes of the sheet record mounted on said support and for reverse movement into outer position into engagement with the drive holes of the sheet record; means for moving said drive pins between said inner and outer positions; a transverse peripheral section on said support ahead of said drive pins openable to receive the leading edge of a sheet record mounted on said support; and means intercoupling said peripheral section with said drive pins to cause the peripheral section to be opened and closed respectively as the drive pins are moved into said inner and outer positions.

2. The record support set forth in claim 1 including means for biasing said drive pins in said outer positions and said peripheral section in closed position, including releasable latch means for latching said drive pins in said inner positions and said peripheral section in open position.

3. A revolvably-mounted record-supporting drum adapted for carrying a flexible sheet record in wrap-around relation thereto, said drum having a peripheral slot along the axis thereof for receiving the leading edge of a sheet record; a bail embracing said drum lengthwise thereof and pivoted to the ends of said drum, the cross member of said bail being adapted substantially to close said slot and complete the periphery of the drum as the bail is closed; drive pins on said drum adapted to engage complementary drive holes in said sheet to carry the sheet with the drum; means mounting said drive pins for radial movement between projecting and non-projecting positions; and means coupling said drive pins to said bail to cause the drive pins to be moved into non-projecting positions as the bail is opened and into projecting positions as the bail is closed.

4. The combination set forth in claim 3 including a loading structure for presenting a sheet record into loading position for attachment to said drum; means for locating said drum in a loading position wherein said bail is at the end of said loading structure, said cross member of said bail having an inclined surface positioned outwardly from the periphery of the drum and inclined thereto when the bail is open for directing the leading edge of the sheet record into said slot as the sheet record is presented into loading position; and means operable to close said bail and move said drive pins into projecting positions while the drum is at standstill.

5. In a machine for operation on a sheet record supported in the form of a substantially closed loop: the combination of a record support having a substantially endless peripheral surface for carrying said sheet record in wrap-around relation thereto; recedable drive pins on said support for engaging complementary drive holes in the leading portion of a sheet record; a peripheral section of said support ahead of said drive pins being movable to open a slot in said support to receive the leading edge of a sheet record; means for locking said support in a loading position with said drive pins in receded positions and said peripheral section open; a loading means for directing the sheet record into a loading position wherein the leading edge thereof engages said slot, said drive holes being positioned to register with said drive pins when the sheet record and record support are in said loading positions; and means for unlocking said support and concurrently closing said peripheral section and moving said drive pins outwardly into engagement with said drive holes.

6. In a machine for operation on a sheet record supported in the form of a substantially closed loop: the combination of a record support having a substantially endless peripheral surface for supporting said sheet record in wrap-around relation thereto; releasable means for attaching the leading edge of the sheet record to the support to provide for drive of the sheet record as the support is advanced; means engageable with the under side of the trailing edge of the sheet record to strip the record from the support as the support is reversely rotated through substantially one revolution of movement from the position it has when said stripping means engages the trailing edge of the sheet; means operated automatically to detent the support on completion of said substantially one revolution of reverse sheet-record stripping movement thereof; means operable while said support is in detented position to release said attaching means from the sheet record; and interlocking means operatively interposed between said support and the frame of the machine, said interlocking means being engaged by operation of said release means for concurrently locking said support against movement in either direction.

7. In a machine for operation on a sheet record supported in the form of a substantially closed loop: the combination of a record support having a substantially endless peripheral surface for supporting said sheet record in wrap-around relation thereto; sheet loading means for presenting the leading edge of a sheet record into loading position for attachment to said support; sheet-record attaching means on said support operable when said attaching means is at said loading position for securing the leading edge of the sheet record to said support; a power-operated drive for advancing said support; means responsive to reverse rotation of said support for detenting said record support with its attaching means located in said loading position; and means operable while said support is at standstill in its said loading position for releasing said sheet-record attaching means to detach the sheet record from said support, said releasing means having means associated therewith for concurrently locking said support against movement in either direction as said releasing means is operated.

8. In a machine for operation on a sheet record supported in the form of a substantially closed loop: the combination of a record support having a substantially endless peripheral surface for supporting said sheet record in wrap-around relation thereto; sheet loading means for presenting the leading edge of a sheet record into loading position for attachment to said support; sheet-record attaching means on said support operable when said attaching means is at said loading position for securing the leading edge of the sheet record to said support; a power-operated drive for said support; a movable stripper plate in juxtaposition with the peripheral surface of said support for engaging the under side of the trailing edge of a mounted sheet record to strip the same from said support as the support is reversely rotated; means operative automatically upon moving said support reversely through a predetermined movement terminating with said attaching means at said loading position of the sheet record for locking said support against further reverse movement; and manual means operable to release said locking means temporarily for another revolution of reverse movement of said support and concurrently to press and stripping plate yieldably against the periphery of said support.

9. In a machine for operation on a sheet record supported in the form of a substantially closed loop: the combination of a record support having a substantially endless peripheral surface for supporting said sheet record in wrap-around relation thereto; sheet loading means for presenting the leading edge of a sheet record into loading position for attachment to said support; sheet-record attaching means on said support operable when said attaching means is at said loading position for securing the leading edge of the sheet record to said support; a power-operated drive for said support; a peripheral section on said support operable to open a peripheral slot adapted for receiving the leading edge of a sheet record mounted on the support; means for locking said support in a loading position whereat said attaching means is at the loading position of the sheet record; and means coupled with said locking means for opening said peripheral section and for releasing said attaching means from the sheet record concurrently as said support is locked in its loading position.

10. The combination set forth in claim 9 wherein said attaching means comprises movably mounted, radially extending drive pins on said support adapted for engaging complementary drive holes in the leading portion of the sheet record and movable into retracted positions to release the sheet record, and wherein said sheet loading means is adapted to guide a leading portion of a sheet record across said retracted drive pins and into said slot; and including means for closing said peripheral section and moving said drive pins outwardly into engagement with said drive holes as said locking means is unlocked.

11. In a machine for operation on a sheet record supported in the form of a substantially-closed loop: the combination of a record support having a substantially endless peripheral surface for supporting said sheet record is wrap-around relation thereto; means for releasably attaching the leading portion of the sheet record to said support; a movable stripper plate in juxtaposition with the peripheral surface of said support for engaging the underside of the trailing edge of a mounted sheet record to strip the record from said support as the support is reversely rotated; means operative automatically upon moving said support reversely through substantially a full revolution from a point where said stripper plate begins engagement with the trailing edge of the sheet record for locking said support against further reverse movement; and manual means operable to release said locking means temporarily for another revolution of reverse movement of said support and to move said stripper plate concurrently into engagement with said support.

References Cited in the file of this patent

UNITED STATES PATENTS

| | | |
|---|---|---|
| 1,713,644 | Davis | May 21, 1929 |
| 2,083,044 | Storck | June 8, 1937 |
| 2,231,109 | Breuer et al. | Feb. 11, 1941 |
| 2,451,080 | Finch et al. | Oct. 12, 1948 |
| 2,513,409 | Grafstein et al. | July 4, 1950 |
| 2,622,000 | Thompson | Dec. 16, 1952 |
| 2,622,517 | Denison et al. | Dec. 23, 1952 |
| 2,653,819 | Roberts | Sept. 23, 1953 |
| 2,666,808 | Cooley | Jan. 19, 1954 |
| 2,668,718 | Roberts | Feb. 9, 1954 |
| 2,717,549 | Keil | Sept. 13, 1955 |